United States Patent Office 3,350,301
Patented Oct. 31, 1967

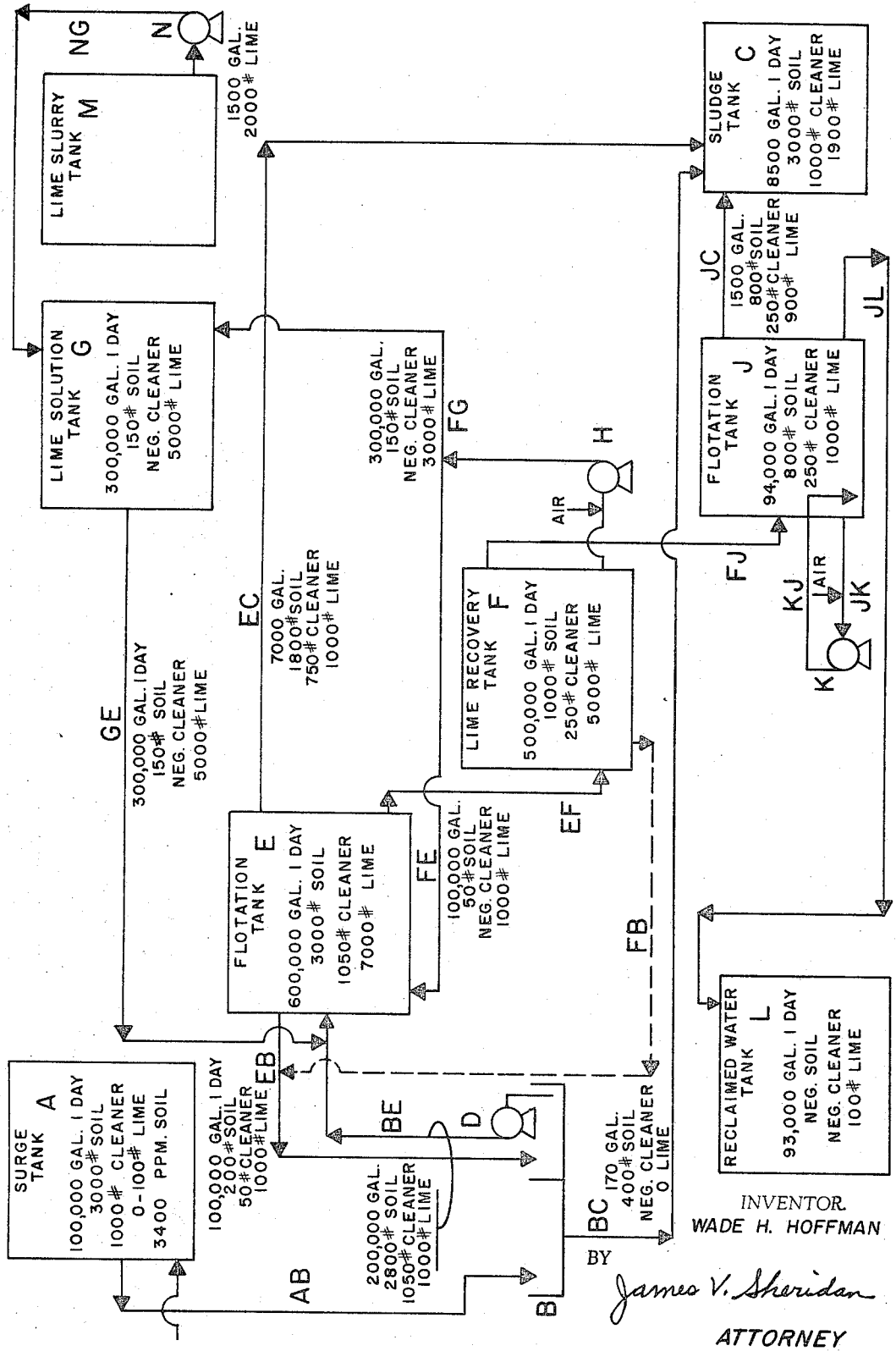

3,350,301
PROCESS FOR THE PURIFICATION OF WASTE WATER BY EMULSION - BREAKING AND FLOTATION
Wade H. Hoffman, 633 Cleveland Ave., Marion, Ohio 43302
Filed July 6, 1964, Ser. No. 380,292
11 Claims. (Cl. 210—44)

This invention concerns the purification of water containing emulsified grease, fats, oils, or the like; such as the waste water from laundries, food processing plants, slaughter houses, paper mills, and the like. The invention, more particularly, is concerned with a novel and effective method of breaking emulsions during the treatment of waste laundry water without the use of either expensive additives or expensive equipment. This application is a continuation-in-part of my copending application Ser. No. 236,671, filed Nov. 9, 1962, now abandoned.

The purification of contaminated water is an old and highly developed art. To make substantially pure water from any waste water does not pose any technical problem if one has unlimited resources. Thus, distillation, ion exchange, electrolysis with subsequent combination of the hydrogen and oxygen, and filtration of coagulated and precipitated impurities represent processes which can produce pure water. These processes, because of their cost, cannot be considered for water treatment in many industrial processes.

This latter situation is particularly true of many relatively small operations involving a narrow profit margin. In these cases; for example, in the case of industrial laundries; a legal requirement that an owner purify waste water before discharging it into a sewer or stream or an economic requirement that the major proportion of the water be returned for reuse could cause the operation to be unprofitable.

Purification systems for waste water containing emulsified fat, oil, or grease have been suggested. These generally involve the preliminary treatment of waste water with solid absorbent materials such as bentonite; involve the steps of acidifying the water and subsequently alkalizing it; involve the addition of calcium chloride, alum or expensive flotation agents; involve heating the water; or involve filtration.

It is a primary purpose of my invention to provide a process for the purification of waste water which avoids the use of the foregoing expensive steps.

Processes of the prior art which are more intimately connected with the present invention are those which involve the recycling of partially purified water, addition of lime, and the use of air bubbles for separation of the impurities by flotation. Use of each of these to advantage in water treatment is known in the art.

It is then a still further object to incorporation into the method of my invention these known devices in a novel manner to secure a surprisingly effective purification process with surprising economy. Thus, although the method of the invention is more more economical than methods of the prior art it is surprisingly effective, permitting, for example, the recovery of more than 90 percent of the treated water in substantially pure form.

The foregoing and related objects are secured in a process for the purification of waste water containing fat, oil, greases, or the like in emulsion which process includes the step of treating the water in a flotation vessel in the presence of lime and air bubbles and the step of recycling partially purified water to said flotation vessel and wherein the improvement comprises the step of diluting the waste water entering the flotation vessel with a sufficient volume of said recycled water to break the emulsion. More particularly, the improvement comprises the steps of diluting each volume of wate water before entering the flotation vessel with a first dilution stream which consists essentially of about an equal volume of water containing a substantial proportion of the soil-lime agglomerates which form in said flotation vessel; diluting each volume of waste water entering the flotation vessel with a second dilution stream which consists essentially of at least one volume of recycled water for each one thousand (1000) parts per million impurities in said waste water, said second dilution stream being substantially purer water than said first dilution stream; and adding said air and lime to said second dilution stream.

The term "impurities" as used herein in connection with laundry waste refers to soil or contaminants derived from the materials being washed and also includes chemicals which have been added to the water during the laundry operation such as cleaning compounds. It would not, however, include the lime added.

Although the improvement of adding sufficient recycled water to break the emulsion in the waste water appears to be novel in the art the effectiveness of this step is significantly improved when it is combined with the recycling of selected agglomerated impurities and the adding of lime and air bubbles via at least one of the recycled streams of water. Further, I have found that even greater advantage may be gained by the novel step of taking a portion of the water fractions to be recycled from upper level water levels in the first flotation separation or from the bottom of a settling tank which holds water taken from the first flotation step.

Thus I have introduced into the method of the invention two steps which, without actual experience in their use, one would assume to be contrary to good engineering practice.

The first of these is the unique use of dilution. Admittedly, it is old to dilute incoming waste water since it is usual in any flotation and settling sequence to select fractions which can economically be put through the sequence a second time. Good engineering practice, however, requires that these fractions be kept to a minimum and that each separation step be carried out in a manner to yield maximum purification. Thus it is not engineering practice to deliberately recycle large volumes of partially purified water; rather these are usually passed on to a separate flotation or settling tank.

In the method of this invention, however, large volumes of water are recycled, not for the purpose of purification of the recycled water, but for the purpose of breaking the emulsion of the fat, oil, and grease impurities in the influent waste water. This generally requires, depending on the concentration of impurities, a volume of recycled water of from about twice to about ten times the volume of influent waste water or at least an additional volume of recycled water for each 1000 p.p.m. impurities in the influent waste water. Thus the advantage to be gained in an effective breaking of the emulsion far outweighs the disadvantage of handling large volumes of recycled liquid. Another advantage of recycling large volumes of liquid is the damping effect it has on surges of influent flows and varying concentrations. The initial surge tank used in the practice of my invention is much smaller than those normally used, thus leading to an economy of installation.

The second step of the invention which appears, at first, to be poor engineering practice is the deliberate recycling to a flotation step of impurities which easily could have been removed in a subsequent flotation or settling step. Thus, these impurities, like the recycled water, are not returned for purpose of purification but rather they are returned for purpose of forming a unique impurity structure during the breaking of the emulsion in the influent waste water. The selected recycled impurities appear to accomplish this desirable result by acting as nuclei to which the newly de-emulsified particles adhere to form a soil-lime agglomerate, a portion of which is recycled to act as nuclei for subsequent waste water. The particles thus formed are easily separable from the liquid phase. Again the advantage to be gained in the build-up of the unique soil-lime agglomerates formed in diluted waste water far outweighs the disadvantage of handling large quantities of recycled impurities.

Although the use of lime in this art is old its utilization in the steps of my invention is particularly advantageous. First, the use of relatively large volumes of recycled water permits of the use of a relatively large ratio of calcium ions to influent waste impurities as compared to the case where relatively small volumes of water are recycled. This avoids the requirement of adding soluble calcium compounds such as calcium chloride for the precipitation of insoluble calcium salts.

This latter advantage in the use of lime in my invention is particularly accentuated where the volume of recycled water is adjusted so that at least one volume of recycled water for each volume of influent waste water is added for each 1000 p.p.m. impurity in the influent water. This dilution, which is approximately that required to break the emulsion is also an effective ratio of calcium ions to influent impurities. Thus dilution of an influent waste water entering a flotation vessel; and carrying, for example about 5000 p.p.m. impurities; to about six times its volume with recycled water carrying lime is a particularly valuable step.

A third advantage of the exclusive use of lime in the steps of my process as opposed to the use of other chemicals which might tend to acidify fractions of the waste water is the control of my entire purification system at a uniform and moderately alkaline pH. Not only does this save on the use of relatively more expensive chemicals but it avoids corrosion problems, thus permitting the use of ordinary steel tanks, iron pipes, and pumps without expensive liners.

An additional advantage of my invention flows from the unique step of selecting for recycling upper levels of floatation liquid from the first flotation step. As indicated previously impurities in such layers tend to act as nuclei for de-emulsified particles of the influent waste water. I found further, however, that such upper levels are relatively enriched in surfactants including cleaning compounds and the fatty amines which occur in laundry wastes. The surfactants can be made to contribute to the effectiveness of the flotation process.

It may be noted that all portions of the water layer in a first flotation step carried out in accordance with the principles of my invention contain soil-lime agglomerates suitable as nuclei for incoming waste. These agglomerates form principally because of the high dilution and, most effectively, if similar agglomerates are "seeded" in the waste water prior to dilution. As indicated there are preferred zones from which such agglomerate "seeds" or nuclei can be taken. One such zone, already described, is the upper level water in the first flotation step. The soil-lime agglomerates of this zone are relatively absorptive and contain sufficient surfactants to form a more floatable floc as compared with agglomerates from the bottom of the settling tank which follows the flotation step. This latter source of agglomerates will now be described.

A second preferred zone in the purification cycle from which the soil-lime agglomerates formed in the dilution step may be taken is the bottom of a settling tank which follows the first flotation step. Thus the highly diluted water of the flotation step, from which impurities have been floated off, is passed to a settling tank and with mild agitation permitted to settle. The solids which tend to settle are relatively enriched in lime as compared, for example, with those from the upper levels of the flotation tank, and I have found that such agglomerates provide very effective nuclei for re-cycling to the incoming waste water and are relatively easier to handle from an engineering standpoint for continuous operation.

Gentle stirring in the described settling tank and release of the nuclei for reseeding also has the advantage of making the decanted upper liquid more readily responsive to secondary flotation.

Those skilled in the art will recognize that there may be a number of ways of utilizing, as nuclei for de-mulsified waste particles, the solid-lime agglomerates formed in the dilution step, the important factor being the maintenance, through back "seeding," of the continuous formation of a waste particle structure which is easily separable from water.

The invention can be better understood by reference to the accompanying drawing which illustrates a specific embodiment of the invention. The quantitative values of flows rates, soil concentration, etc., used in the description of the specific embodiment have been taken from a typical one day operation of an operating purification unit. These specific details are given by way of example only and are not to be construed as limiting the invention. The drawing is schematic and flow between tanks is by gravity unless a pump is shown.

Referring now to the drawing.

Waste water from a laundry is passed into tank A which is a storage or surge tank. Water entering tank A may be quite variable with respect to concentration of impurities since at one time it will be dirty wash water and at another time relatively pure rinse water. The volume of tank A should be sufficient to insure that the water leaving it and being delivered to the purification cycle will be substantially uniform. In most industrial laundries the water leaving tank A will contain about 3000–5000 parts per million (p.p.m.) impurities. This figure averaged 4530 p.p.m. during the one day period of the present example. Of the imprities the portion made up by emulsified fat, oil, grease, or like emulsifiable materials presents the major obstacle to economic purification. Thus by way of example, about 100,000 gallons of water per day leaves tank A and carries about 3000 pounds of soil (3400 p.p.m.) and about 1000 pounds (1100 p.p.m.) of cleaning compounds and has a BOD of about 4000.

The waste water from tank A is passed into a trap B via pipe AB. Trap B serves to separate out some non-emulsified soil, some lint, and some solid objects such as buttons which might foul the pumps in the system. The separated material in the form of a sludge is passed to sludge tank C via a chute BC at a rate of about 170 gallons per day and carrying about 400 pounds of soil per day. This sludge removal can be a periodic batch separation as contrasted to the balance of the operation which is continuous.

The liquid from trap B, still containing the emulsified waste, is pumped via pump D to a first flotation tank E via pipe BE. Before entering tank E, however, the waste water leaving trap B is diluted first with water recycled from flotation tank E and then with additional water from lime recovery tank F and lime solution tank G, the volume and characteristics of these recycled streams of water being the essence of the invention. Thus, for example, 100,000 gallons per day of upper level water carrying 200 pounds of soil, 50 pounds of cleaning compounds, and 1000 pounds of lime are recycled from flotation tank E via pipe EB and dilutes the waste water in trap B in a ratio of about two to one. This ratio does not provides sufficient water to break the emulsion of about 4500 p.p.m. impurities in the incoming waste water but the soil-lime agglomerates recycled from flotation tank E with the recycled water have a unique structure which serves as nuclei for the further agglomeration of de-emulsified particles when de-emulsification takes place upon the more extensive dilution of the waste water via pipes GE and FE. Pipe GE, for example, carries 300,000 gallons of water per day including 150 pounds of soil and 5000 pounds of lime per day. Pipe FE carries 100,000 gallons of water per day including 50 pounds of soil and 1000 pounds of lime per day.

In this manner flotation tank E handles 600,000 gallons of water per day containing 3000 pounds of soil, 1050 pounds of cleaner, and 7000 pounds of lime. In addition the liquid in flotation tank E is charged with air bubbles. Thus, de-emulsified particles (about 1800 pounds soil), the materials forming insoluble calcium salts, a substantial proportion of the cleaning compounds (about 750 pounds) and a relatively small proportion of the lime (1000 pounds) float on the surface of the water and are removed as a sludge via pipe EC to sludge tank C. About 7000 gallons per day of water are lost from the system by this route.

The water layer of flotation tank E is removed in two streams. As indicated above one stream of 100,000 gallons per day is taken from the upper level of water and re-cycled to the incoming waste before any further purification. Also as indicated this is done in part to add dilution water to the incoming waste water but also to provide the incoming waste with the uniquely structured waste particles which form in tank E and result from the carrying out of my invention.

It may be pointed out that although upper level water from flotation tank E is preferred as compared with lower level water in tank E, water from the lower levels could be recycled with advantage since it also contains uniquely structured waste particles which can serve as nuclei for waste in the process of de-emulsification. An additional advantage, however, of using upper level water or tank E for recycling is its relatively greater concentration of surfactants. Thus, for example, upper level water leaving via pipe EB was found to contain about two and one half times as much surfactant concentration as lower level water leaving via pipe EF. The surfactants include not only the cleaning compounds added in the laundry operation but also fatty acid amines normally occurring in laundry wastes. These, of course, contribute to the success of the flotation process.

The second stream of water leaving flotation tank E leaves via pipe EF and enters a settling tank, lime recovery tank F. As indicated by its name this tank serves for the recovery of most of the lime. A stirrer (not shown) provides mild agitation in tank F. About 400,000 gallons of water per day containing 200 pounds of soil, 4000 pounds of lime, and negligible quantities of cleaning compounds are pumped from the bottom of tank F via pump H. Air bubbles are introduced into this stream at the point indicated. This stream is divided into two streams; one going directly to flotation tank E via pipe FE and carrying 100,-000 gallons of water, 50 pounds of soil, and 1000 pounds of lime; and the second stream going indirectly to flotation tank E via pipe FG, lime solution tank G, and pipe GE. This second stream FG carries 300,000 gallons of water, 150 pounds of soil, and 3000 pounds of lime and it picks upon an additional 200 pounds of lime in lime solutions tank G. It is the two streams FE and FG from the bottom of settling tank F which provide most of the dilution water for the waste water entering flotation tank E.

It should be noted that dilution water being recycled to flotation tank E via pipes FE and FG is relatively purer water than that being recycled from the upper levels of flotation tank E. In this manner water purity is balanced such that there will be at least one additional volume of dilution water for each 1000 p.p.m. impurities in the incoming waste. In the example, wherein about 4500 p.p.m. impurities entered the system, the minimum effective dilution was found to be about four and one half volumes of dilution water to one volume of incoming waste—a total volume of 550,000 gallons per day. Actually 600,000 gallons per day were passed through flotation tank E to provide a margin of safety.

A stream of water carrying a relatively high concentration of impurities is taken from the top of settling tank F and is passed to a second flotation tank J via pipe FJ. This stream carries about 94,000 gallons per day of water, 800 pounds of soil, 250 pounds of cleaner and 1000 pounds of lime.

It may be noted that the stream in pipe FJ being taken from the top of settling tank F represents a concentrating of impurities in what would normally be the purified stream. This appears to be contrary to usual engineering principles but the paradox disappears when it is pointed out that the soil particles have at this point been coalesced into well defined entities and are easily separable in the following step. This unique situation results, as discussed previously, from the initial "seeding" and de-emulsifying step which took place in first flotation tank E.

The liquid in flotation tank J is agitated by circulating it via pump K and pipes JK and KJ, air bubbles being introduced into pipe JK at the point indicated. Substantially all remaining impurities are floated to the surface of the water in flotation tank J and are removed as a sludge via pipe JC to sludge tank C. This stream carries about 1500 gallons per day of water, 800 pounds soil, 250 pounds of cleaning compounds, and 900 pounds of lime. A stream of substantially pure water is taken from the bottom of flotation tank J and transferred to a storage tank L via pipe JL. This stream carries about 93,000 gallons per day water, 100 pounds of lime, and negligible quantities of soil and cleaning compounds. Thus, 91.6 percent of the water entering the system was recovered for re-use.

Lime is introduced into the system via lime slurry tank M. About 1500 gallons of water per day carrying 2000 pounds of lime are pumped via pump N and pipe NG to lime solution tank G. Tank G serves to bring together a suitable ratio of lime and recycled water such that the relatively large volume of recycled water entering flotation tank E will carry sufficient calcium ions to precipitate all materials forming insoluble calcium salts as well as to carry sufficient lime particles to assist in the formation of the uniquely structured nuclei particles which form in flotation tank E.

Broken line FB in the drawing leads from the bottom of settling tank F to trap B and represents an alternative pipe to pipe EB. By this route incoming waste water in trap B would be diluted with water from the bottom of settling tank F instead of water from the upper levels of flotation tank E. As indicated previously the highly diluted water of flotation tank E can be permitted to settle to concentrate the unique soil-lime agglomerates which act as particle nuclei during de-emulsification.

I claim:

1. The continuous process for the purification of waste water containing fat, oil, grease, or the like in emulsion which comprises the steps of:

collecting a sufficient quantity of said waste water in a storage tank in order to provide for the continuous delivery of a substantially uniform waste water to a purification system;

passing said waste water to a trap;

then passing said waste water to a first flotation vessel and simultaneously diluting it with re-cycled water containing lime and air bubbles, each volume of waste water being diluted with at least an additional volume of re-cycled water for each 1000 parts per million impurities in said waste water;

re-cycling about one volume of water from said flotation vessel to said trap for each volume of waste water entering said trap;

floating off impurities from said flotation water in the form of a sludge;

passing the water fraction in said flotation tank to a settling tank;

permitting said water fraction to settle;

separating said water fraction into a first stream, a second stream, and a third stream;
passing said first stream from the top of said settling tank to a second flotation tank for further purification;
re-cycling said second stream from the bottom of said settling tank to the waste water entering the first flotation vessel;
taking said third stream from the bottom of said settling tank;
adding lime to said third stream;
and recycling said third stream to the waste water entering the first flotation vessel.

2. The continuous process for the purification of waste water containing fat, oil, grease, or the like in emulsion which comprises the steps of
collecting a sufficient quantity of said waste water in a storage tank in order to provide for the continuous delivery of a substantially uniform waste water to a purification system;
passing said waste water to a trap;
then passing said waste water to a first flotation vessel and simultaneously diluting it with re-cycled water containing lime and air bubbles, each volume of waste water being diluted with at least an additional volume of re-cycled water for each 1000 parts per million impurities in said waste water;
floating off impurities from said flotation water in the form of a sludge;
passing the water fraction in said flotation tank to a settling tank; permitting said water fraction to settle;
separating said water fraction into a first stream, a second stream, a third stream, and a fourth stream;
passing said first stream from the top of said settling tank to a second flotation tank for further purification;
re-cycling said second stream from the bottom of said settling tank to the waste water entering the first flotation vessel;
taking said third stream from the bottom of said settling tank;
adding lime to said third stream;
re-cycling said third stream to the waste water entering the first flotation vessel;
and re-cycling said fourth stream from the bottom of said settling tank to said trap, about one volume of said fourth stream being re-cycled for each volume of waste water entering said trap.

3. In a process for the purification of waste water containing fat, oil, grease, or the like soil in emulsion which process includes the step of treating the water in a flotation vessel in the presence of lime and air bubbles and the step of recycling partially purified water to said flotation vessel, the improvement which comprises:
(1) the step of diluting the waste water entering said flotation vessel with a sufficient volume of said recycled partially purified water to break the emulsion; whereby said waste water in said flotation vessel separates into fractions comprising a water layer having a level which is relatively enriched in surfactants; and
(2) including, as a portion of said recycled water, water from said surfactant-enriched level.

4. In the process for the purification of waste water containing fat, oil, grease, or the like soil in emulsion which process includes the step of treating said water in a flotation vessel in the presence of lime and air bubbles and the step of recycling water to said flotation vessel and which process includes the separation into fractions of said waste water in said flotation vessel; and fractions comprising a water layer having an upper and a lower level, a sludge layer which floats on said water layer, and a fraction of soil-lime agglomerates suspended in said water layer; the improvement which comprises:
(1) diluting the waste water entering the flotation vessel with a sufficient volume of said recycled water to break the emulsion; and
(2) including in said recycled water, as the major constituent thereof, the portion of the water from said flotation vessel having the fraction of soil-lime agglomerates suspended therein.

5. In the process according to claim 4 the improvement which comprises the steps of diluting the waste water entering the flotation vessel with a sufficient volume of said recycled water to break the emulsion and including in said recycled water about one volume of upper level water from said flotation vessel for each volume of said waste water.

6. In the process according to claim 4 the improvement which comprises the steps of transferring the water layer from said flotation tank to a settling tank; permitting a relatively more concentrated lime fraction to form in the bottom of said settling tank; diluting the waste water entering the flotation tank with a sufficient volume of said recycled water to break the emulsion; and including in said recycled water about one volume of water from the bottom of said settling tank for each volume of said waste water.

7. In the process according to claim 4 the improvement which comprises the steps of diluting each volume of waste water before entering the flotation vessel with about one volume of water recycled from said upper water level of said flotation vessel and diluting each volume of waste water with at least an additional volume of recycled water for each 1000 parts per million impurities in said waste water.

8. In the process according to claim 4 the improvement which comprises the steps of transferring the water layer from said flotation tank to a settling tank, permitting a relatively more concentrated lime fraction to form in the bottom of said settling tank, diluting each volume of waste water entering the flotation vessel with at least an additional volume of recycled water for each 1000 parts per million impurities in said waste water, and including in said recycled water about one volume of water from the bottom of said settling tank for each volume of said waste water.

9. In the process according to claim 4 the improvement which comprises the steps of diluting each volume of waste water before entering the flotation vessel with a first dilution stream which consists essentially of about an equal volume of water containing a substantial proportion of said soil-lime agglomerates; diluting each volume of waste water entering the flotation vessel with a second dilution stream which consists essentially of at least one volume of recycled water for each 1000 parts per million impurities in said waste water, said second dilution stream being substantially purer water than said first dilution stream; and adding said air and lime to said second dilution stream.

10. In the process according to claim 4 the improvement which comprises the steps of diluting each volume of waste water before entering the flotation vessel with a first dilution stream which consists essentially of about an equal volume of water recycled from said upper water level of said flotation vessel; diluting each volume of waste water entering the flotation vessel with a second dilution stream which consists essentially of at least one volume of recycled water for each 1000 parts per million impurities in said waste water, said second dilution stream being substantially purer water than said first dilution stream; and adding said air and lime to said second dilution stream.

11. In the process according to claim 4 the improvement which comprises the steps of transferring the water layer from said flotation tank to a settling tank; permitting a relatively more concentrated lime fraction to form in the bottom of said settling tank; diluting each volume of waste water before entering the flotation tank with a first dilution stream which consists essentially of about an equal volume of water recycled from the bottom of said settling tank; diluting each volume of waste water entering the flotation vessel with a second dilution stream which consists essentially of at least one volume of recycled water for each 1000 parts per million impurities in said waste water, said second dilution stream being substantially purer water than said first dilution stream; and adding said air and lime to said second dilution stream.

References Cited

UNITED STATES PATENTS 2,766,203　10/1956　Brown et al. _____ 210—62 X

OTHER REFERENCES

Bloodgood et al.: Fundamental Studies on the Removal of Emulsified Oil by Chemical Flocculation, Proceedings of the Seventh Industrial Waste Conference, Purdue Univ., 1952, pp. 361–374 (P.O.S.L.).

MICHAEL E. ROGERS, *Primary Examiner.*